United States Patent [19]

Shiba et al.

[11] Patent Number: 4,504,048
[45] Date of Patent: Mar. 12, 1985

[54] MICRO-ADJUSTABLE DISPLACEMENT AND ROTATION SETTING APPARATUS

[75] Inventors: Kazuo Shiba; Masao Takahashi, both of Tokorozawa; Akira Kanai, Higashiyamato; Kouichi Koizumi, Matsudo, all of Japan

[73] Assignee: Citizen Watch Company Limited, Tokyo, Japan

[21] Appl. No.: 441,131

[22] Filed: Nov. 12, 1982

[30] Foreign Application Priority Data

Nov. 13, 1981 [JP] Japan .................. 56-181863
Mar. 26, 1982 [JP] Japan .................. 57-48627
Mar. 26, 1982 [JP] Japan .................. 57-48628

[51] Int. Cl.³ .............................................. B23Q 1/04
[52] U.S. Cl. ...................................... 269/71; 308/5 R
[58] Field of Search ........................... 269/20, 71, 73; 308/3 A, 5 R; 384/99

[56] References Cited

U.S. PATENT DOCUMENTS 3,466,951  9/1969  Greenburg .................. 308/5 R
3,658,393  4/1972  Luthi ......................... 308/5 R Primary Examiner—James G. Smith
Assistant Examiner—Judy J. Hartman
Attorney, Agent, or Firm—Jordan and Hamburg

[57] ABSTRACT

An apparatus is disclosed which enables a controlled member (e.g. a workpiece retaining member in a jig) to be adjusted in position by extremely small amounts of linear displacement or angular rotation, with a very high degree of accuracy and static and dynamic stability. The apparatus is based on a servo system controlled by electrical signals and employs hydrostatic pads to support and move the controlled member.

2 Claims, 3 Drawing Figures

MICRO-ADJUSTABLE DISPLACEMENT AND ROTATION SETTING APPARATUS

BACKGROUND OF THE INVENTION

The present invention relates to a micro-adjustable displacement and rotation setting apparatus which is capable of applying extremely small amounts of linear displacement or angular rotation to a controlled member such as a workpiece-retaining jig portion of precision machining equipment.

At present, there are a large number of applications requiring apparatus which will provide very minute amounts of linear movement or rotation of a controlled member, which for example may support a workpiece which is to undergo highly precise machining, or may comprise part of an apparatus used for some type of precision measurement. Here, the term "minute" refers to linear displacements of the order of 0.005 microns or less, or angular rotations of 0.01 seconds or less. It is generally essential that such an apparatus be substantially free from backlash effects, should have a high degree of adjustment resolution, and should display excellent dynamic and static stability. In the present context, the term "stability" indicates that the apparatus should perform rapid movement of the controlled member to a new position when such a change is designated, without overshoot or oscillation, and should retain the controlled member firmly in the designated position to a high degree of accuracy irrespective of momentary loads being applied to the controlled member. Such momentary loads can occur in the course of machining a workpiece held by the controlled member, for example. The qualities referred to above are also sometimes referred to as the "stiffness" of the system. A micro-adjustable displacement and rotation setting apparatus according to the present invention meets these requirements for static and dynamic stability to a much greater extent that has been possible in the prior art, yet is basically simple and economical to manufacture. Such a micro-adjustable displacement and rotation setting apparatus will therefore prove valuable in a wide variety of applications, in the fields of machinery manufacture, precision measurement, etc.

SUMMARY OF THE INVENTION

A micro-adjustable displacement and rotation setting apparatus according to the present invention basically comprises a controlled member, whose position is to be adjustable to a very high degree of accuracy by linear displacement and angular rotation, a bearing support member which rotatably supports the controlled member through the action of a plurality of hydrostatic pads supplied with flows of an operating fluid at controlled pressures, displacement sensors for sensing relative displacements between portions of the controlled member and the bearing support member, a source of command signals for designating a desired position of the controlled member, electronic circuit means for comparing the command signals with signals produced by the displacement sensors, to thereby generate error signals, and servo valves controlled by these error signals which act to control the pressures of the working fluid applied to the hydrostatic pads. It can therefore be understood that such an apparatus comprises a servo loop, i.e. a negative feedback loop, in which the control input quantity is in the form of electrical signals (command signals) and in which an error between the current position of the controlled member and the position designated by the control input quantity is converted into an amount of force which is applied to the controlled member by the hydrostatic pads. It has been found that such a system is highly suitable for a micro-adjustable displacement and rotation setting apparatus to provide minute amounts of linear displacement (e.g. of the order of 0.005 microns) or angular rotation (e.g. of the order of 0.01 sec) to a controlled member, yet can have a very simple configuration.

DESCRIPTION OF THE PREFERRED EMBODIMENTS

Figure 1:
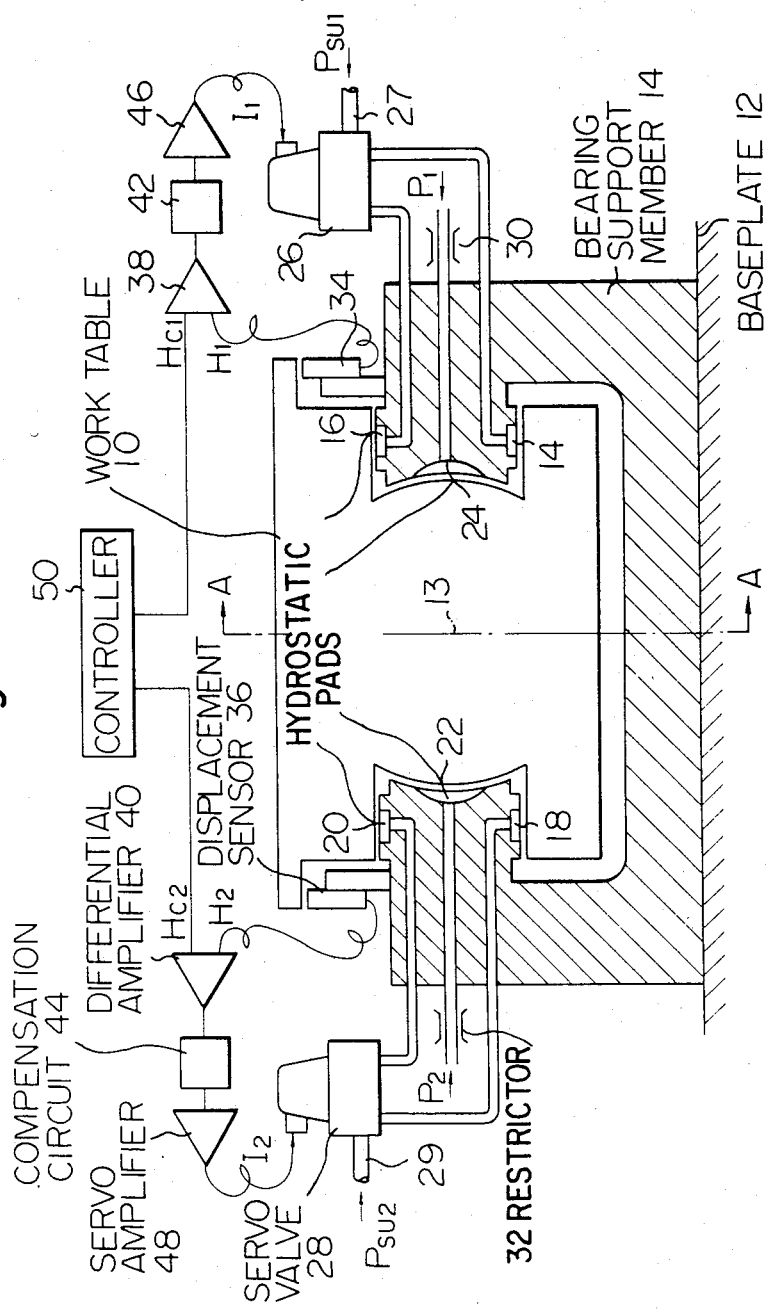
FIG. 1 is a cross-sectional view and simplified circuit diagram of an embodiment of a planing machine work table position adjustment system according to the present invention.

FIG. 1 shows an embodiment of a micro-adjustable displacement and rotation setting apparatus according to the present invention, comprising a controlled member, which in this case is a work table 10 of a planing machine, a bearing support member 14 mounted on a baseplate 12, and a system for displacing table 10 upward or downward (i.e. in a direction parallel to the plane of FIG. 1) or rotating table 1, by amounts which are determined by command signals produced by a controller 50. The work table 1 is held in a fixed position with respect to movement to the left or right, and mounted such as to enable movement in the upward or downward directions or rotation about a central axis designated by numeral 13, which is oriented perpendicular to the plane of the paper, as viewed in FIG. 1, by means of hydrostatic bearings provided in bearing support member 14 and comprising a set of six hydrostatic pads, denoted by numerals 15, 16, 18, 20, 22 and 24. Movement in the upward or downward directions is controlled by variation of the pressures of operating fluid flows which are applied to lower hydrostatic pads 15 and 18 and to upper hydrostatic pads 16 and 20, and these hydrostatic pads 15 to 20 also serve to control rotation of table 10 about axis 13. The pair of lateral hydrostatic pads 22 and 24, on the other hand, provided on the left hand and right hand sides of bearing support member 13 equidistant from axis of rotation 13, serve to hold table 1 in a fixed position with respect to movement to the right or left, being supplied with flows of the operating fluid at fixed pressures which are controlled by restrictors 32 and 30 respectively. It will be apparent that with this structure, the axis of rotation 13 will pass through a point which is equidistant from the centers of pressure of the four areas of the surface of work table 10 which are subjected to fluid pressure force by static pads 15, 16, 18 and 20, and that assuming that these four centers of pressure are co-planar, each point on work table 10 will rotate in a plane which is parallel to that common plane of the centers of pressure.

Control of the pressures at which the operating fluid is supplied to the pair of upper and lower hydrostatic pads 15 and 16 is performed by a servo valve 26, which receives the operating fluid at a pressure Psu1, and controls the relative pressures of the operating fluid supplied to hydrostatic pads 15 and 16 in accordance with signals applied from a servo amplifier 46. Similarly, the relative pressures of the operating fluid supplied to upper and lower hydrostatic pads 18 and 20 are controlled by servo valve 28, which operates under the control of output signals from a servo-amplifier 48.

Numerals 34 and 36 denote displacement sensors, which serve to detect relative displacement between the right and left hand sides of table 10 respectively, relative to bearing support member 14, with respect to movement in the upward and downward directions. These displacement sensors 34 and 36 generate displacement signals which indicate the amounts of such displacements of table 10, and these displacement signals are input to differential amplifiers 38 and 40 respectively. The controller 50 produces command signals HC1 and HC2, whose values designate the current position required for table 10. Command signal HC1 from controller 50 is compared with displacement H1 from displacement sensor 34 by means of differential amplifier 38. Any difference between these signals indicates an error between the current position of the right hand side of work table 10 and the required position as designated by command signal HC1, and this results in an error signal being generated by differential amplifier 38, which is input through a compensation circuit 42, to produce a desired phase characteristic for the servo loop, to servo amplifier 46. An output drive signal $I_1$ is thereby generated by servo amplifier 46 which causes servo valve 26 to control the pressure differential between the operating fluid flows to upper and lower hydrostatic pads 15 and 16 such as to displace the right hand side of table 10 in a direction which reduces the amount of error, i.e. the difference between command signal HC1 and displacement signal H1. In an identical manner, command signals HC2 is compared with displacement signal H2 from displacement sensor 36, and any error between the current position of the left hand side of table 1 and the position designated by the value of command signal HC2 results in an error signal being produced from differential amplifier 40, which is transferred through compensation circuit 44 and amplified by servo amplifier 48, to thereby produce a drive signal 12 to control servo valve 28 to produce a pressure differential between the operating fluid pressures applied to upper and lower hydrostatic pads 20 and 18. The left hand side of table 10 is thereby moved into a position designated by command signal HC2. In other words, movement of table 10 in the upward direction can be brought about by a suitable amount of change being produced simultaneously in command signals HC1 and HC2. This will result in error signals being produced by differential amplifiers 38 and 40 which will lead to an increase in the operating fluid pressure applied to hydrostatic pad 15 relative to upper hydrostatic pad 16, and in the pressure applied to lower hydrostatic pad 18 relative to that applied to upper hydrostatic pads 20, whereby the bearing gaps of hydrostatic pads 15 and 18 will be increased relative to the bearing gaps of hydrostatic pads 16 and 20. In other words, force will be applied to table 10 by hydrostatic bearings 15 to 20 causing table 10 to be moved upward, by an amount designated by the values of command signals HC1 and HC2. This upward movement will cease when displacement H1 balances command signal HC1, and displacement signal H2 balances command signal HC2.

Similarly, rotation of table 10 about axis of rotation 13 can be accomplished by altering command signals HC1 and HC2 by amounts which are equal but opposite in polarity. This will result in one side of table 10 being moved upward by a specific displacement and the opposite side being moved down by an equal displacement.

In general, if the values of command signals HC1 and HC2 are assumed to represent amounts of displacement, and if the distance between displacement sensors 34 and 36 is designated as L, then a displacement H of the center of table 10 resulting from command signals HC1 and HC2 is given by the equation:

$$H = (HC1 + HC2)/2$$

If the angular rotation of table 10 about center of rotation 13 resulting from command signals HC1 and HC2 is designated as $\phi$, then this is given as:

$$\sin \phi = (HC1 - HC2)/L$$

If (HC1−HC2) is assumed to be sufficiently small in relation to L, then the following is approximately true:

$$\phi = (HC1 - HC2)/L$$

Thus, since L is constant, it will be apparent that linear displacement, angular rotation or both simultaneous linear displacement and angular rotation of table 10 can be accomplished by suitably varying the amplitudes and polarities of command signals HC1 and HC2.

It can therefore be understood that with a micro-adjustable displacement and rotation setting apparatus in accordance with the present invention, a feedback (i.e. servo) system is utilized in which force, applied through a plurality of hydrostatic pads acting as bearings, is employed as a control parameter, acting on a controlled member, with the feedback system acting to equalize command signals and displacement signals representing amounts of displacement of the controlled member. Such a system enable the position of the controlled member to be altered or preserved with a very high degree of accuracy, with respect to both linear displacement and angular rotation. Such as system also enables both linear displacement and angular rotation to be performed simultaneously, and also enables compensation to be applied such that a desired part of the controlled member is held in a fixed position irrespective of rotation of the controlled member as a whole. In other words, in the case of the preferred embodiment, it is possible to provide compensation such that a part of table 10 will be held at a fixed level as table 10 is rotated.

Compensation circuits 42 and 44 are incorporated to enable adjustment of the control system characteristics, e.g. for adjustment of the static characteristics of the system.

Figure 2:
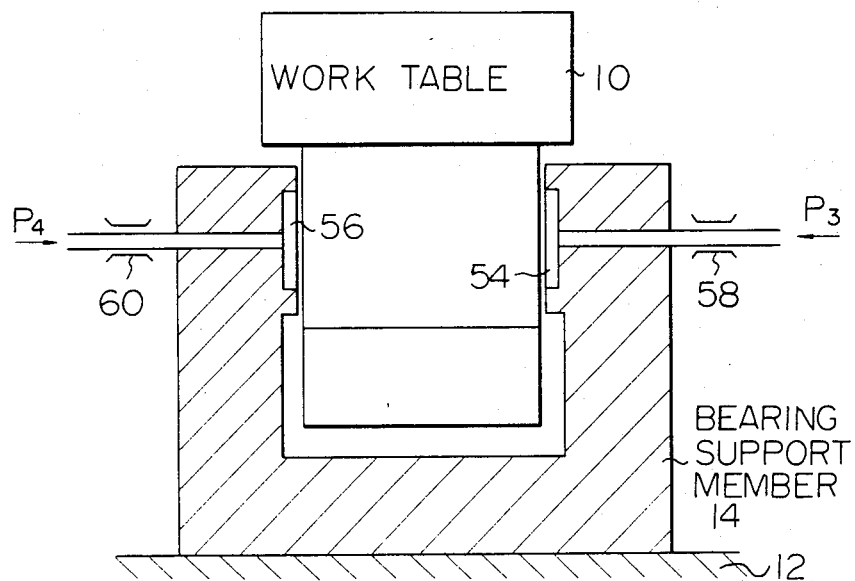
FIG. 2 is a cross-sectional view of the apparatus of FIG. 1, taken perpendicular to the plane of FIG. 1.

FIG. 2 is a cross-sectional view taken through A—A in FIG. 1, to illustrate how table 10 is held in a fixed position with respect to movement forward or backward (i.e. with respect to movement to the left or right, as seen in FIG. 2). As shown, control of such movement is provided by a second pair of lateral hydrostatic pads 54 and 56, which are supplied with flows of the operating fluid at fixed pressures by means of fixed restrictors 58 and 60 respectively. It will be apparent that such an arrangement permits free movement of table 10 in the plane of FIG. 1.

Figure 3:
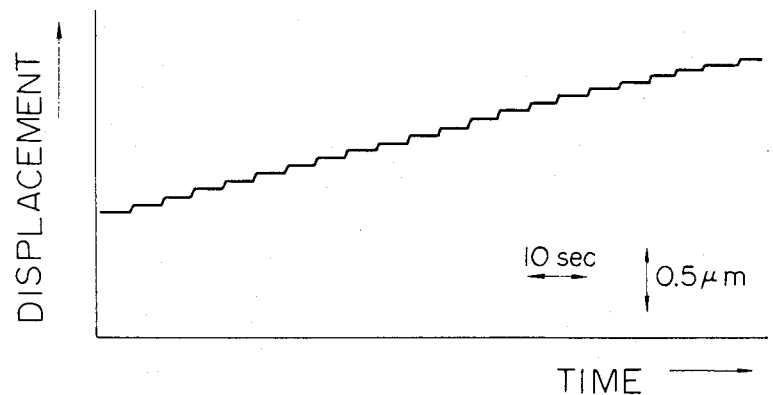
FIG. 3 is a graph illustrating the response of a micro-adjustable displacement and rotation setting apparatus according to the present invention with respect to step increments in displacement of the controlled member.

It has been found that a micro-adjustable displacement and rotation setting apparatus according to the present invention enables extremely stable and accurate adjustment of the position of a controlled member to be attained for very small amounts of linear displacement or angular rotation, e.g. of the order of 0.005 microns or less in the case of displacement, or 0.01 sec or less, in the case of rotation. This is illustrated in the graph of FIG. 3, which shows the results of applying step displacements successively to a controlled member by a micro-adjustable displacement and rotation setting apparatus according to the present invention. As shown, each displacement step is performed highly precisely and rapidly, without overshoot or oscillation.

It should be noted that a micro-adjustable displacement and rotation setting apparatus according to the present invention is not limited to the use of a liquid such as oil for the operating fluid, and it is possible to use a suitable gas, such as air, for the operating fluid.

Furthermore, in the preferred embodiment described above, a single set of hydrostatic pads, functioning as a static pressure bearing is provided on the left and right sides of the bearing support member. However it is equally possible to provide a plurality of sets of such hydrostatic pads on each side, in order to ensure increased stability against momentary loads applied to the controlled member.

In addition, although the controlled member is shown as only being movable in a single dimension (i.e. in directions parallel to the plane of FIG. 1), it is possible to arrange for movement in directions parallel to other planes.

It will therefore be apparent from the above description that a micro-adjustable displacement and rotation setting apparatus according to the present invention will be of value in various types of application, including high precision machining, measuring equipment, etc, in which a controlled member must be adjusted in position with a high degree of accuracy and stability.

It should be noted that although the present invention has been described with reference to a specific embodiment, various modifications may be envisaged thereto, which fall within the scope claimed for the present invention, as set out in the appended claims. The above description of the preferred embodiment should therefore be interpreted in an illustrative, and not in a limiting sense.

What is claimed is:

1. A micro-adjustable displacement and rotation setting apparatus for rotating a controlled member about at least one axis of rotation by freely controllable amounts of angular displacement and linearly moving said controlled member in at least one predetermined direction of linear movement by freely controllable amounts of linear displacement, comprising:

a bearing support member for movably supporting said controlled member by a plurality of pairs of hydrostatic pads, the hydrostatic pads in each of said pairs being positioned to apply mutually opposing forces to said controlled member, each hydrostatic pad being disposed opposite and adjacent to a surface of said controlled member, each of said hydrostatic pads being coupled to valve means supplying a flow of operating fluid under pressure, said pairs of hydrostatic pads comprising at least a first and a second pair of hydrostatic pads for rotating and linearly displacing said controlled member, said first and second pairs being respectively disposed in symmetrically opposite orientations with respect to said axis of rotation, with each of said first and second pair of hydrostatic pads comprising at least one hydrostatic pad applying force to said controlled member tending to cause rotation of said controlled member in one direction about said axis of rotation and a second hydrostatic pad applying force to said controlled member tending to cause rotation of said controlled member in the opposite direction about said axis of rotation, a third pair of hydrostatic pads for restraining said controlled member against movement in a direction perpendicular to said axis of rotation, disposed to apply mutually opposing forces to said controlled member in a direction substantially perpendicular to said axis of rotation, and a fourth pair of hydrostatic pads for restraining said controlled member against movement in a direction parallel to said axis of rotation, disposed to apply mutually opposing forces to said controlled member in a direction substantially parallel to said axis of rotation;

first displacement sensing means disposed at a first side of said controlled member for sensing movement of said first side of the controlled member along said direction of linear displacement as measured at a position of said first displacement sensing means and generating a first displacement signal indicative thereof, and second displacement sensing means disposed at a second side of said controlled member in a position symmetrically opposite to that of said first displacement sensing means with respect to said axis of rotation, for sensing movement of said second side of the controlled member along said direction of linear displacement as measured at a position of said second displacement sensing means and generating a second displacement signal indicative thereof;

a controller operable to generate command signals designating a desired amount and direction of rotation or linear displacement of said controlled member, said command signals comprising a first command signal designating an amount and direction of linear displacement of said first side of the controlled member and a second command signal designating an amount and direction of linear displacement of said second side of the controlled member;

first differential amplifier circuit means for comparing said first command signal with said first displacement signal to thereby generate a first error signal indicative of a difference therebetween and first servo amplifier circuit means for amplifying said first error signal to produce a first drive signal, and second differential amplifier circuit means for comparing said second command signal with said second displacement signal to thereby generate a second error signal indicative of a difference therebetween and second servo amplifier circuit means for amplifying said second error signal to produce a second drive signal;

first servo valve means responsive to said first drive signal for controlling relative pressures of flows of said operating fluid supplied respectively to the hydrostatic pads of said first pair of hydrostatic pads to thereby produce said desired amount and direction of displacement of said first side of the controlled member, and second servo valve means responsive to said second drive signal for controlling relative pressures of flows of said operating fluid supplied respectively to the hydrostatic pads of said second pair of hydrostatic pads to thereby produce said desired amount and direction of displacement of said second side of the controlled member; and restrictor valve means for supplying flows of said operating fluid at specified fixed pressures to said third and fourth pair of hydrostatic pads.

2. A micro-adjustable displacement and rotation setting apparatus according to claim 1, in which each hydrostatic pad of said third pair of hydrostatic pads has a substantially concave contour and in which the surface of said controlled member corresponding to each of said hydrostatic pads of the third pair of hydrostatic pads has a corresponding substantially convex contour, to facilitate rotation of said controlled member about said axis of rotation.

* * * * *